United States Patent [19]

Nakane et al.

[11] Patent Number: 5,173,357
[45] Date of Patent: Dec. 22, 1992

[54] TEAR-RESISTANT POLYESTER FILM AND LAMINATED SHEETS COMPRISED OF THE SAME

[75] Inventors: Toshio Nakane; Yukihiko Kageyama; Kenji Hijikata, all of Shizuoka, Japan

[73] Assignee: Polyplastics Co., Ltd., Osaka, Japan

[21] Appl. No.: 705,619

[22] Filed: May 29, 1991

[30] Foreign Application Priority Data

May 30, 1990 [JP] Japan ................................ 2-142116

[51] Int. Cl.⁵ .................... B32B 27/10; B32B 27/36
[52] U.S. Cl. .................................. 428/220; 428/336; 428/338; 428/339; 428/480; 428/481; 524/95; 524/97
[58] Field of Search ................. 524/95, 97; 428/338, 428/480, 481, 220, 339, 336

[56] References Cited

U.S. PATENT DOCUMENTS

| 4,499,219 | 2/1985 | Buxbaum et al. | 524/94 |
| 4,595,612 | 6/1986 | Tavss et al. | 428/35 |
| 4,946,372 | 8/1990 | Avni | 428/325 |
| 4,957,578 | 9/1990 | Huffman et al. | 156/244.11 |
| 5,049,603 | 9/1991 | Mochizuki | 524/97 |

FOREIGN PATENT DOCUMENTS 0400936  5/1990  European Pat. Off.

Primary Examiner—Paul J. Thibodeau
Assistant Examiner—D. S. Nakarani
Attorney, Agent, or Firm—Nixon & Vanderhye

[57] ABSTRACT

Polyester film has a thickness of between 10 to 500 μm and exhibits excellent tear strength retention against thermal history conditions. The film is prepared from a resin composition which includes 100 parts by weight of a polyester consisting essentially of alkylene terephthalate groups as the main recurring units in the polymer chain and between 0.1 to 5 parts by weight of a bisoxazoline compound incorporated thereinto. The film is usefully employed as a sterilizing bag or as a food-packaging material and can be laminated to anther sheet of film or to paper.

8 Claims, No Drawings

TEAR-RESISTANT POLYESTER FILM AND LAMINATED SHEETS COMPRISED OF THE SAME

FIELD OF THE INVENTION

The present invention generally relates to polyester films or sheets. More specifically, the present invention relates to tear-resistant polyester films having a high tear strength and an excellent tear strength retention (even after being subjected to thermal history conditions), and to composite laminated sheets which include the polyester film.

BACKGROUND AND SUMMARY OF THE INVENTION

Aromatic polyesters such as polyethylene terephthalate (PET) and polybutylene terephthalate (PBT) are known to exhibit well-balanced and desirable physical properties, such as thermal resistance, mechanical strength and gas impermeability. As a result, aromatic polyesters are widely used as engineering plastics to form a number of articles used in various end-use applications.

Recently, composite sheets comprised of resin films laminated one to another and/or to a backing sheet (e.g. paper) have been proposed so as to attain beneficial properties—for example, to take advantage of the excellent film-forming and gas barrier properties of aromatic polyesters generally.

One problem associated with aromatic polyesters however is that, since they are crystalline resins, the tear strength is reduced significantly by thermal history conditions, such as heat treatments after film formation and/or exposure to a heated environment during use. Therefore, aromatic polyester films cannot be subjected to any after-treatments which would expose them to heat (e.g. heated drying) and/or be used in a high-temperature environment. As a result of this problem, the field of use for films formed of aromatic polyesters has been limited.

The present invention is therefore directed to polyester films which significantly minimize (if not eliminate) the problems associated with the use of conventional polyester films. That is, the present invention is directed to polyester resin films comprised of a polyalkylene terephthalate polyester and a bisoxazoline compound blended therewith in amount effective to improve the tear-strength retention after thermal treatment of the resulting film. Thus, it has been found that the incorporation of a bisoxazoline compound with a polyalkylene terephthalate polyester imparts excellent tear-strength retention even after the film has been subjected to thermal history conditions.

In preferred forms, the present invention relates to a polyester film having a thickness of between 10 to 500 μm and comprised of 100 parts by weight of a polyester consisting of alkylene terephthalate groups as main recurring units in the polymer chain, and between 0.1 to 5 parts by weight of a bisoxazoline compound. The polyester films according to the present invention as noted above exhibit excellent tear-strength tension even when subjected to thermal history conditions and thus may be used by themselves in various end-use applications (e.g. food packaging). However, the films of the present invention may also be laminated to another different resin film and/or paper to form a composite sheet having specific properties attributable to each layer forming the composite structure.

Further aspects and advantages of this invention will become more clear to the reader after careful consideration is given to the detailed description of the preferred exemplary embodiments thereof which follow.

DETAILED DESCRIPTION OF THE PREFERRED EXEMPLARY EMBODIMENTS

The preferred polyester base resin used in the films of the present invention comprises alkylene terephthalate groups as the main recurring units in the polymer chain and is produced mainly by the polycondensation of terephthalic acid or an ester-forming derivative thereof with an alkylenedihydroxyl compound. Examples of the alkylenedihydroxyl compounds include ethylene glycol, propylene glycol, butanediol, neopentyl glycol and ester-forming compounds thereof.

The preferred polyesters used in the present invention may also be copolyesters comprised of the above-described polyalkylene terephthalate groups as the main constituent units, and 20 molar % or less, preferably 15 molar % or less, of another comonomer. Examples of the comonomers that may be used in this regard include known dicarboxylic acids such as isophthalic naphthalenedicarboxylic, diphenyldicarboxylic diphenyl ether dicarboxylic, diphenylethanedicarboxylic, cyclohexanedicarboxylic, adipic and sebacic acids as well as derivatives thereof substituted with an alkyl, alkoxy or halogen. These dicarboxylic acid compounds can also be used in the form of ester-forming derivatives, such as lower alcohol esters, e.g. dimethyl esters. They can be used either alone or in combination of two or more of the same.

Examples of the dihydroxyl compounds for forming the copolyesters include one or more of hydroquinone, resorcinol, dihydroxyphenyl, naphthalenediol, dihydroxydiphenyl ether, cyclohexanediol, 2,2-bis(4-hydroxyphenyl) propane and diethoxybisphenol A as well as polyoxyalkylene glycols and derivatives thereof substituted with an alkyl, alkoxy or halogen.

In addition, hydroxycarboxylic acids such as hydroxybenzoic acid, hydroxynaphthoic acid and diphenyleneoxycarboxylic acid as well as derivatives thereof substituted with an alkyl, alkoxy or halogen can also be used. Further ester-forming derivatives of these compounds are also usable as comonomers and can be used either alone or in combination of two or more of the same.

Copolyesters having a branched or crosslinked structure comprising the above-described compounds and a small amount of a copolyester-forming trifunctional monomer such as trimellitic acid, trimesic acid, pyromellitic acid, pentaerythritol or trimethylolpropane are also usable.

Any polyester comprising alkylene terephthalate groups as the main component in the polymer chain and which is formed by the polycondensation of the above-described compounds as the monomer components can be used either alone or in the form of a mixture of two or more of the same may be used as the polyester base resin component of the present invention. Most preferred are polybutylene terephthalate and copolymers mainly comprising polybutylene terephthalate groups.

The starting polyesters used in the present invention are produced by interfacial polycondensation, melt polymerization, solution polymerization or solid phase polymerization according to well known condensation reaction or transesterification reaction techniques.

The bisoxazoline compounds to be incorporated into the composition for the film or sheet according to the present invention are those represented by the following general formula (1):

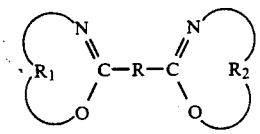

wherein R represents a divalent organic group selected from among alkylene, substituted alkylene, arylene and substituted arylene groups, and $R_1$ and $R_2$ each represent an alkylene or substituted alkylene group, preferably an ethylene or propylene group.

Examples of the bisoxazoline compounds of the general formula (1) include
2,2'-methylenebis(2-oxazoline),
2,2'-ethylenenbis(4-methyl-2-oxazoline),
2,2-propylenebis(2-oxazoline),
2,2'-tetramethylenebis(2-oxazoline),
2,2'-hexamethylenebis(2-oxazoline),
2,2'-octamethylenebis(2-oxazoline),
2,2'-p-phenylenebis-(2-oxazoline),
2,2'-p-phenylenebis(4-methyl-2-oxazoline),
2,2'-p-phenylenebis(4,4-dimethyl-2-oxazoline),
2,2'-p-phenylenebis(4-phenyl-2-oxazoline),
2,2'-m-phenylenebis-(2-oxazoline),
2,2'-m-phenylenebis(4-methyl-2-oxazoline),
2,2'-m-phenylenebis(4,4-dimethyl-2-oxazoline),
2,2'-m-phenylenebis(4-phenyl-2-oxazoline),
2,2'-o-phenylenebis(2-oxazoline),
2,2'-phenylbis-(4-methyl-2-oxazolne),
2,2'-bis(2-oxazoline),
2,2'-bis(4-methyl-2-oxazoline),
2,2'-bis(4-ethyl-2-oxazoline) and
2,2'-bis(4-phenyl-2-oxazoline).

These oxazoline compounds can be used either alone or in combination of two or more of the same.

The preferred bisoxazoline compounds above formula wherein R represents an arylene group, particularly a phenylene group.

2,2'-m-phenylenebis(2-oxazoline) is a particularly preferred compound within the above definition.

The amount of the bisoxazoline compound to be added to the polyester base resin is between 0.1 to 5 parts by weight, preferably between 0.1 to 3 parts by weight, per 100 parts by weight of the polyester base resin. When an insufficient amount of the bisoxazoline compound is employed, the effect thereof on the tear-strength retention of the film, particularly after heating, cannot be exhibited. On the contrary, when an excess amount of the bisoxazoline compound is used, the viscosity of the resin blend increases significantly. In addition, decomposition products are increased in an amount which unfavorably color the film or sheet and which impairs the tearing resistance thereof.

The bisoxazoline compound may be added during polymerization of the polyester or may be added by melt-blending with the polyester base resin in the course of producing polyester pellets or during production of the polyester film.

Although the film of the present invention exhibits excellent properties by the addition of the bisoxazoline compound, further additives can optionally be incorporated thereinto in order to further improve and or enhance the film's properties. Examples of such optional additives include stabilizers (such as antioxidants and ultraviolet absorbers); antistatic agents; flame retardants; flame retarding assistants; colorants such as dyes and pigments; lubricants for improving fluidity and releasability; crystallization accelerators (nucleating agents); and inorganic substances. It has been particularly discovered that when an antioxidant is used, an increased antioxidizing effect can be realized in combination with the bisoxazoline compound.

Preferred stabilizers include hindered phenolic compounds, amine compounds and phosphorus compounds. Examples of the hindered phenolic compounds include 2,2'-methylenebis(4-methyl-6-t-butylphenol), mexamethylene glycol bis(3,5-di-t-butyl-4-hydroxyphenyl cinnanmate), tetrakis[methylene(3,5-di-t-butyl-4-hydroxyphenyl cinnamate)]methane, triethylene glycol bis[3-(3-t-butyl-4-hydroxy-5-methylphenyl) propionate], 1,3,5-trimethyl-2,4,6-tris(3,5-di-t-butyl-4-hydroxybenzyl)benzene, n-octadecyl 3-(4'-hydroxy-3',5'-di-t-butylphenyl) propionate, 4,4-methylenebis(2,6-di-t-butylphenol), 4,4'-butylidenebis(6-t-butyl-3-methylphenol), 2,2'-thiodethylbis[3-(3-(3,5-di-t-butyl-4-hydroxyphenyl)-propionate], distearyl 3,5-di-t-butyl-4-hydroxybenzyl-phosphonate, and 2-t-butyl-6-(3-t-butyl-5-methyl-2-hydroxybenzyl)-4-methylphenyl acrylate. They can be used singly or in combination of two or more the same. Among them, particularly preferred are hexamethylene glycol bis(3,5-di-t-butyl-4-hydroxyphenyl cinnamate), tetrakis[methylene(3,5-di-t-butyl-4-hydroxyphenyl cinnamate)]methand and triethylene glycol bis-[3-(3-t-butyl-4-hydroxy-5-methylphenyl) propionate].

Examples of the amine compounds include N-phenyl-N'-isopropyl-p-phenylenediamine, N,N'-diphenylenediadine, 4,4'-bis(4-α,α-dimethylbenzyl)diphenylamine, diphenylamine/acetone condensate, N-phenylnaphthylamine and N,N'-di-β-naphthylphenylenediamine.

Examples of the phosphorus compounds include phosphite and phosphonite compounds. A particularly preferred phosphonite compound is tetrakis(2,4-di-t-butylphenyl) 4,4-diphenylenephosphonite.

One or more other thermoplastic resins can optionally be blended in the composition in order to improve the melt extrusion film-forming properties, lubricity and/or flexibility provided that the tear-strength retention properties are not impaired. Examples of the optional thermoplastic resins include polyester resins other than those described above, polyamide resins, polyolefin resins, polycarbonates, polyurethanes, butyl rubbers, ABS and polyacrylate resins. These optional thermoplastic resins, when used, are present in an amount of not more than 20 parts by weight, preferably not more than 15 parts by weight, per 100 parts by weight of the polyester base resin.

The films of the present invention can be prepared by any known film-forming process. In this connection, films are usually produced by the T-die process or the inflation process. In the T-die process, a molten plastic is spread to a desired film width to form a flow having a thickness which is as uniform as possible by extrusion through a slit nozzle to form the film. The film is then cooled to solidify the resin. The inflation process is frequently employed when polyethylene is molded into a film. In this process, molten plastic is extruded through an annular extrusion molding nozzle to form a tube, and a fluid (such as air) is blown into the tube to inflate it, thereby forming a tubular film.

The T-die and inflation processes have both advantages and disadvantages. The productivity of the inflation process is usually higher than that of the T-die process and, therefore, the former is more economical than the latter. Further the inflation process is suitable for the production of relatively thin films. However, the inflation process cannot be employed for all resin materials. Resin materials processable with this process are limited to quite specific resins such as polyolefins. It has usually been believed that polyesters, such as polyethylene terephthalate and polybutylene terephthalate, can be molded into films by the T-die process but that they could not easily be molded into films by the inflation process. However, the film or sheet of the present invention can be produced easily by the inflation process due to its improved tear strength resistance properties. It is to be noted that the processes described above are only exemplary and should not be construed to limit the present invention.

A preferred thickness of the film or sheet of the present invention ranges between 10 to 500 μm. When the thickness is less than 10 μm, the tearing strength of the film is insufficient and practically undesirable. When the thickness is over 500 μm, however, problems of flexibility ensue, such as whitening of a folded part of the film.

The film may be monoaxially or biaxially stretched in the course of the production thereof so that the film thickness will be within the range described above and/or to improve the film's physical properties e.g., by orientation of the film.

A feature of the film according to the present invention is that it has remarkably improved retention of the tearing strength against thermal history conditions. That is, the film or sheet of the present invention has an initial value of the tearing strength determined according to JIS P 8116 as described below of at least 15 gf (in terms of the tearing strength per 10 μm thickness) and a retention of the tearing strength of at least 70% after being subjected to thermal history conditions of 120° C. for 3 minutes.

The tearing strength values expressed herein and in the accompanying claims were determined using a tearing tester provided with a fixed clamp and a mobile clamp which moves along with a sectorial pendulum. After conducting predetermined calibrations, test pieces were placed at the center of the clamp on the horizontal surface of a table and fixed so that the longer side thereof was parallel to an upper end of the clamp face. A knife of the tester was moved to slit the test pieces at right angles to the upper end of the clamp so as to leave the test piece unslit in a dimension of 43 mm. The number of the test pieces that were clamped was controlled so that the reading of the scale fell in the range of 20 to 60 when the test pieces were torn. The pendulum was raised, the pointer was set at the stop thereof and the pendulum was released so as to tear completely the test pieces. The tearing strength for 10 μm thickness was determined from reading the scale according to the following formula:

$$T = A/S \times 16 \times 10/t$$

wherein T represents the tearing strength (in terms of the tearing strength for 10 μm thickness) (gf/number of pieces·10 μm), A represents the reading of the scale, S represents the number of the torn test pieces and t represents the thickness of the film (μm).

According to the present invention, the above-described film may be combined with a paper sheet to form a laminated paper composite structure. This laminated paper also has an excellent tear-strength retention against thermal history. That is, the laminated paper also has an initial tear-strength value determined according to JIS P 8116 of at least 15 gf (in terms of the tearing strength for 10 μm thickness of the polyester resin film layer of the laminated paper) and a tear-strength retention of at least 70% after thermal history at 120° C. for 3 minutes.

Processes for producing the laminated paper composite structure of the present invention are also not limited, and thus any of the known processes can be employed in this regard. The laminated paper can be produced, for example, by a process wherein the polyester film or sheet of the present invention is contact-bonded with a paper sheet by means of rolls. Alternatively, the polyester film of the present invention may be melt-extruded over a paper sheet. If necessary, an adhesive may be applied to the paper or other means of improving the adhesion can be employed.

The films, sheets and laminated composite paper structures of the present invention exhibit high tearing strength and, particularly retain that tearing strength even after being subjected to thermal history conditions. The present invention may thus be used as excellent materials for bags for sterilization, reheatable food packaging and heat-resistant wrappers.

EXAMPLES

The following nonlimiting Examples will further illustrate the present invention.

EXAMPLE 1

100 parts by weight of polybutylene terephthalate (PBT) pellets having an intrinsic viscosity of 1.1 and 0.5 part by weight of 1,3-phenylenebisoxazoline (1,3-PBO) were homogeneously melt-kneaded by means of an ordinary extruder to form pellets.

These pellets were melted again in the extruder and molded into a film having a thickness of 30 μm by the inflation process. The film was cut into test pieces each having a size of 76 mm × 63 mm, which were subjected to the tearing test according to JIS P 8116 as described above. The tearing strength observed by tearing the test pieces in parallel with the direction of winding in the production of the film (longitudinal direction) and that observed by tearing the test pieces at right angles to the direction of winding (transverse direction) were determined.

Other test pieces cut from the film were heated at 120° C. for 3 min. cooled to room temperature and subjected to the same tests as those described above to determine the retention of the tearing strength.

The results are given in Table 1.

EXAMPLES 2 AND 3

The same procedures as those of Example 1 were repeated except that the amount of the bisoxazoline added was altered to 1.0 part by weight and that the film was formed by the T-die process to vary the film thickness.

The results are given in Table 1.

COMPARATIVE EXAMPLES 1 AND 2

A film was produced in the same manner as that of Examples 1 and 2 except that no bisoxazoline was used and then the film was subjected to the same test as above.

The results are given in Table 1.

EXAMPLE 4

The same procedures as those of Example 1 were repeated except that 1,3-phenylenebisoxazoline (1,3-PBO) was replaced with 1,4-phenylenebisoxazoline (1,4-POB).

The results are given in Table 2.

EXAMPLE 5

3 parts by weight of a polycarbonate having an intrinsic viscosity of 1.1 and 0.5 part by weight of 1,3-phenylenebisoxazoline (1,3-PBO) were added to 100 parts by weight of polybutylene terephthalate (PBT) pellets having an intrinsic viscosity of 1.1 and then a film was produced and tested in the same manner as that of Example 1.

The results are given in Table 2.

EXAMPLE 6

A film was prepared and tested in the same manner as that of Example 1 except that 100 parts by weight of PBT copolyester pellets having an intrinsic viscosity of 1.1 and containing 4 molar %, based on the dicarboxylic acid component, of isophthalic acid was used as the starting polyester.

The results are given in Table 2.

EXAMPLE 7

A film was prepared and tested in the same manner as that of Example 1 except that 0.2 part by weight of triethylene glycol bis-[3-(3-t-butyl-4-hydroxy-5-methylphenyl) propionate] was further used as an antioxidant in the production of the resin composition.

The results are given in Table 2.

EXAMPLE 8 AND COMPARATIVE EXAMPLE 3

The polyester resin composition used in Example 2 or Comparative Example 1 was melted and applied to a paper sheet having a thickness of 52.3 g/m² with an extruder having a T-die to form a resin layer having a thickness of 30 μm and pressed with rolls to form a composite paper, which was subjected to the same test as that of Example 1.

The results are given in Table 3.

TABLE 1

|  | Ex. 1 | Ex. 2 | Ex. 3 | Comp. Ex. 1 | Comp. Ex. 2 |
| --- | --- | --- | --- | --- | --- |
| Starting polyester | PBT | " | " | " | " |
| (parts by weight) | (100) | (") | (") | (") | (") |
| Intrinsic viscosity | 1.1 | " | " | " | " |
| Additive | 1,3-PBO | " | " | — | — |
| (parts by weight) | (0.5) | (1.0) | (") | (—) | (—) |
| Film-forming process | inflation process | T-die process | T-die process | inflation process | T-die process |
| Film thickness (μm) | 30 | 100 | 200 | 30 | 100 |
| Tearing strength (in terms of tearing strength for 10 μm thickness) (gf/sheet · 10 μm) |  |  |  |  |  |
| (longitudinal) | 26 | 29 | 27 | 10 | 15 |
| (transverse) | 29 | 31 | 31 | 12 | 17 |
| Tearing strength (in terms of tearing strength for 10 μm thickness) after heating at 120° C. for 3 min (gf/sheet · 10 μm) |  |  |  |  |  |
| (longitudinal) | 21 | 24 | 23 | 6 | 9 |
| (transverse) | 23 | 26 | 27 | 8 | 11 |
| Retention (%) |  |  |  |  |  |
| (longitudinal) | 81 | 83 | 85 | 60 | 60 |
| (transverse) | 79 | 84 | 87 | 67 | 65 |

TABLE 2

|  | Ex. 4 | Ex. 5 | Ex. 6 | Ex. 7 |
| --- | --- | --- | --- | --- |
| Starting polyester | PBT | " | PBT copolyeser | PBT |
| (parts by weight) | (100) | (") | (") | (") |
| Intrinsic viscosity | 1.1 | " | " | " |
| Additive | 1,4-PBO | 1,3-PBO | " | 1,3-PBO stabilizer |
| (parts by weight) | (0.5) | (") | (") | (0.5) (0.2) |
| Film-forming process | inflation process | " | " | " |
| Film thickness (μm) | 30 | " | " | " |
| Tearing strength (in terms of tearing strength for 10 μm thickness) (gf/sheet · 10 μm) |  |  |  |  |
| (longitudinal) | 26 | 32 | 33 | 26 |
| (transverse) | 28 | 35 | 35 | 29 |
| Tearing strength (in terms of tearing strength for 10 μm thickness) after heating at 120° C. for 3 min (gf/sheet · 10 μm) |  |  |  |  |
| (longitudinal) | 21 | 26 | 26 | 23 |
| (transverse) | 22 | 29 | 28 | 25 |
| Retention (%) |  |  |  |  |
| (longitudinal) | 81 | 81 | 79 | 88 |
| (transverse) | 79 | 83 | 80 | 86 |

*1: 3 parts by weight of polycarbonate was also added thereto.

TABLE 3

|  | Ex. 8 | Comp. Ex. 3 |
| --- | --- | --- |
| Starting polyester | PBT | PBT |
| (parts by weight) | (100) | (100) |
| Intrinsic viscosity | 1.1 | 1.1 |
| Additive | 1,3-PBO | — |
| (parts by weight) | (1.0) | (—) |
| Tearing strength (in terms of tearing strength for 10 μm thickness) (gf/sheet · 10 μm) |  |  |
| (longitudinal) | 81 | 74 |
| (transverse) | 96 | 87 |
| Tearing strength after heating at 120° C. for 3 min (gf/sheet · 10 μm) |  |  |
| (longitudinal) | 65 | 32 |
| (transverse) | 70 | 34 |
| Retention (%) |  |  |
| (longitudinal) | 80 | 43 |
| (transverse) | 73 | 39 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A polybutylene terephthalate film having a thickness of between 10 to 500 μm and exhibiting excellent tear-strength retention after being subjected to thermal history conditions, said film being formed of a resin composition which consists essentially of a blend of 100 parts by weight of a polybutylene terephthalate base resin and between 0.1 to 5 parts by weight of a bisoxazoline compound, and wherein said film has an initial tear strength value determined according to JIS P 8116 of at least 15 grams-force per 10 μm thickness of said film and a tear strength retention of at least 70% after being subjected to thermal history conditions of 120° C. for 3 minutes.

2. A polybutylene terephthalate film according to claim 1, wherein said polybutylene terephthalate base resin predominately includes 1,4-butylene terephthalate groups.

3. A polybutylene terephthalate film according to claim 1 or 2 wherein the bisoxazoline compound is phenylenebisoxazoline.

4. A polybutylene terephthalate film according to claim 3, wherein said resin composition further consists essentially of between 1 to 20 parts by weight of another thermoplastic resin per 100 parts by weight of the polybutylene terephthalate base resin.

5. A laminated paper composite sheet comprised of a paper sheet laminated to a polybutylene terephthalate film, wherein said film has a thickness of between 10 to 500 μm and exhibits excellent tear-strength retention after being subjected to thermal history conditions, said film being formed of a resin composition which consists essentially of a blend of 100 parts by weight of a polybutylene terephthalate base resin, and between 0.1 to 5 parts by weight of a bisoxazoline compound, and wherein said film has an initial tear strength value determined according to JIS P 8116 of at least 15 grams-force per 10 μm thickness of said film and a tear strength retention of at least 70% after being subjected to thermal history conditions of 120° C. for 3 minutes.

6. A composite sheet as in claim 5, wherein said polybutylene terephthalate base resin of said polybutylene terephthalate film predominately includes 1,4-butylene terephthalate groups.

7. A composite sheet as in claim 5 or 6, wherein the bisoxazoline compound is phenylenebisoxazoline.

8. A composite sheet according to claim 7, wherein resin composition further consists essentially of between 1 to 20 parts by weight of another thermoplastic resin per 100 parts by weight of the polybutylene terephthalate base resin.

* * * * *

UNITED STATES PATENT AND TRADEMARK OFFICE
CERTIFICATE OF CORRECTION

PATENT NO.  : 5,173,357
DATED       : December 22, 1992
INVENTOR(S) : NAKANE et al It is certified that error appears in the above-identified patent and that said Letters Patent is hereby corrected as shown below:

On the title page, item [57],

Under "Abstract", line 10, delete "anther" and insert --another--.

Column 1, line 49, after "in" insert --an--.

Column 3, line 42, after "compounds" insert --within the definition of the--;
        line 43, after "mula" insert --are those--.

Column 5, line 7, after "Further" insert a comma (,).

Column 10, line 24, after "wherein" insert --said--.

Signed and Sealed this

Second Day of November, 1993

Attest:

BRUCE LEHMAN

Attesting Officer        Commissioner of Patents and Trademarks